United States Patent [19]
Baxter, Jr.

[11] Patent Number: 5,702,319
[45] Date of Patent: Dec. 30, 1997

[54] HYDROMECHANICAL SYSTEM FOR LIMITING DIFFERENTIAL SPEED BETWEEN DIFFERENTIALLY ROTATING MEMBERS

[75] Inventor: Ralph W. Baxter, Jr., Ft. Wayne, Ind.

[73] Assignee: Dana Corporation, Toledo, Ohio

[21] Appl. No.: 543,173

[22] Filed: Oct. 13, 1995

[51] Int. Cl.⁶ .................................................. F16H 48/30
[52] U.S. Cl. ............................... 475/88; 475/84; 418/32
[58] Field of Search ................................ 475/80, 83, 84, 475/88, 160; 418/32, 171

[56] References Cited

U.S. PATENT DOCUMENTS

| | | | |
|---|---|---|---|
| 3,748,928 | 7/1973 | Shiber | 475/88 |
| 3,894,446 | 7/1975 | Snoy et al. | 475/88 |
| 3,990,327 | 11/1976 | Margolin | 475/80 |
| 4,353,269 | 10/1982 | Hiersig | 475/80 X |
| 4,727,966 | 3/1988 | Hiramatsu et al. | 192/0.033 |
| 4,730,514 | 3/1988 | Shikata et al. | 74/711 |
| 4,743,180 | 5/1988 | Sickenger | 418/32 |
| 4,776,424 | 10/1988 | Naito | 180/233 |
| 4,811,614 | 3/1989 | Lasoen | 74/15.63 |
| 5,310,388 | 5/1994 | Okcuoglu et al. | 475/88 |
| 5,320,586 | 6/1994 | Baxter, Jr. | 475/88 |
| 5,494,421 | 2/1996 | Wada et al. | 418/32 |
| 5,501,585 | 3/1996 | Ogawa et al. | 418/171 |
| 5,536,215 | 7/1996 | Shaffer et al. | 475/88 |

Primary Examiner—Charles A. Marmor
Assistant Examiner—Peter T. Kwon
Attorney, Agent, or Firm—Oldham & Oldham Co., LPA

[57] ABSTRACT

A hydromechanical system for limiting differentiation between a first rotating member and a second rotating member in a drivetrain subassembly. The hydromechanical system comprises a clutch assembly for selectively coupling the first rotating member to rotate with the second rotating member and a hydraulically actuated piston assembly for applying force on the clutch assembly to actuate the clutch assembly in response to hydraulic pressure such that the first rotatable member is selectively coupled to rotate with the second rotatable member. A clutch actuating pump, including a reservoir, is provided for supplying hydraulic pressure to the piston assembly to actuate the piston assembly, wherein the clutch actuating pump communicates hydraulic fluid under pressure to the piston assembly in response to differential rotation between the first and second rotating members. A second pump is also provided in fluid communication with the reservoir of the clutch actuating pump for supplying hydraulic fluid to the reservoir of the clutch actuating pump. The hydromechanical system is well suited for use in a four-wheel drive transfer case to control differentiation between the front and rear output shafts thereof.

20 Claims, 3 Drawing Sheets

HYDROMECHANICAL SYSTEM FOR LIMITING DIFFERENTIAL SPEED BETWEEN DIFFERENTIALLY ROTATING MEMBERS

BACKGROUND OF THE INVENTION

The present invention relates generally to a hydromechanical system for limiting differential speed between differentially rotating members, such as may be found in a vehicle drivetrain.

Known hydromechanical systems have utilized hydraulic pumps which pump fluid in response to relative rotation between two rotating members for purposes of rotatably coupling the rotating members. These systems generally include a hydraulic pump coupled to the rotating members, which in turn feeds a hydraulically actuated piston. The piston in turn acts on a clutch assembly connecting the two rotating members. The hydraulic pump provides volumetric flow of fluid that varies in direct proportion to the relative or differential rotational speeds of the rotating members. Generally, the hydraulic piston is equipped with an outlet orifice that restricts the outflow of fluid from the piston in order to generate a back pressure of fluid, which drives the piston to engage the clutch mechanism. Such systems therefore provide a capacity for torque transfer between the rotating members that varies in direct proportion to the relative or differential speed between the two shafts.

In vehicle drivetrains for example, it is often desirable to limit differential speed between differentially rotating shafts. Four-wheel drive vehicles conventionally employ front and rear drive axles, with each axle having a differential for driving the wheels of the vehicle. A torque transfer case is generally used to distribute torque to the front and rear differentials, and may be provided with an interaxle differential for dividing torque between the front and rear differentials in a desired ratio. A selectively engagable clutch has been used to limit differential rotation between the front and rear axles of the vehicle by "locking" the interaxle differential upon sensing a predetermined differential rotation between the front and rear output shafts of the transfer case.

An electronic control system or a mechanical control system may be utilized to control the clutch mechanism to lock the interaxle differential when excessive differentiation between the rotating members occurs, but not during vehicle operations where a certain amount of differentiation is necessary. For example, during vehicle turning on dry pavement, the front wheels of the vehicle will rotate faster than the rear wheels, causing differentiation between the rotating members within the transfer case. Such differentiation is desirable for proper vehicle cornering and to avoid excessive wear of the tires during these turning operations. Also, a vehicle may be equipped with differently sized front and rear tires, leading to normal differentiation within the transfer case. On the other hand, when a wheel on one of the axles encounters a low traction surface with a low coefficient of friction causing the wheel to spin excessively, locking of the interaxle differential to prevent further differentiation until the low traction condition has been overcome is desirable.

One problem associated with known hydromechanical interaxle differential clutch actuation mechanisms has been the inability to supply the required amount of hydraulic fluid to the reservoir of the high pressure dutch-actuating hydraulic pump at all vehicle speeds. For example, when a vehicle is initially set in motion, such as may occur at start-up, the rear wheels of the vehicle may begin to slip relative to the front causing the clutch-actuating hydraulic pump to begin pumping. Prior systems have required the clutch pump to "pull" the required hydraulic fluid from a sump, with the hydraulic circuit including an amount of air therein. In these systems, the clutch actuating pump therefore pulls a quantity of air from the associated fluid channels before the required amount of hydraulic fluid is available for the pump to generate sufficient hydraulic pressure to actuate the clutch assembly. The pumping and introduction of air into the hydraulic system causes irregular performance of the clutch actuating pump.

Prior systems have attempted to minimize the amount of air drawn into the hydraulic system of the clutch actuating pump by providing the clutch pump with a reservoir adjacent to the rotating pump components. However, friction between the stationary reservoir and rotating pump components has been found to cause damage such as the components being "welded" together, rendering the pump inoperable.

SUMMARY OF THE INVENTION

Based upon the foregoing, the invention provides a hydromechanical system for limiting differentiation between a first rotating member and a second rotating member in a drivetrain subassembly which overcomes the deficiencies noted in the prior art. The hydromechanical system comprises a dutch assembly for selectively coupling the first rotating member to rotate with the second rotating member and a hydraulically actuated piston assembly for actuating the dutch assembly in response to hydraulic pressure. A clutch actuating pump, including a reservoir, is provided for supplying hydraulic pressure to actuate the piston assembly, wherein the clutch actuating pump communicates hydraulic fluid under pressure to the piston assembly in response to differential rotation between the first and second rotating members. A second pump is also provided in fluid communication with the reservoir of the clutch actuating pump for supplying hydraulic fluid to the reservoir of the clutch actuating pump.

The present invention provides the advantage of ensuring the clutch actuating pump is able to pump fluid substantially instantaneously in response to differential rotation of the first and second rotating members by utilizing the second pump to maintain the reservoir of the dutch actuating pump full at all times. In this manner, the clutch actuating pump is not required to draw hydraulic fluid (and potentially air) from a sump or the like, eliminating delay in pumping and eliminating the introduction of air into the hydromechanical system. In the preferred embodiment, the clutch actuating pump reservoir is formed as a part of the pump housing itself, eliminating the possibility of welding together of stationary and rotating pump components.

DETAILED DESCRIPTION OF THE INVENTION

Figure 1:
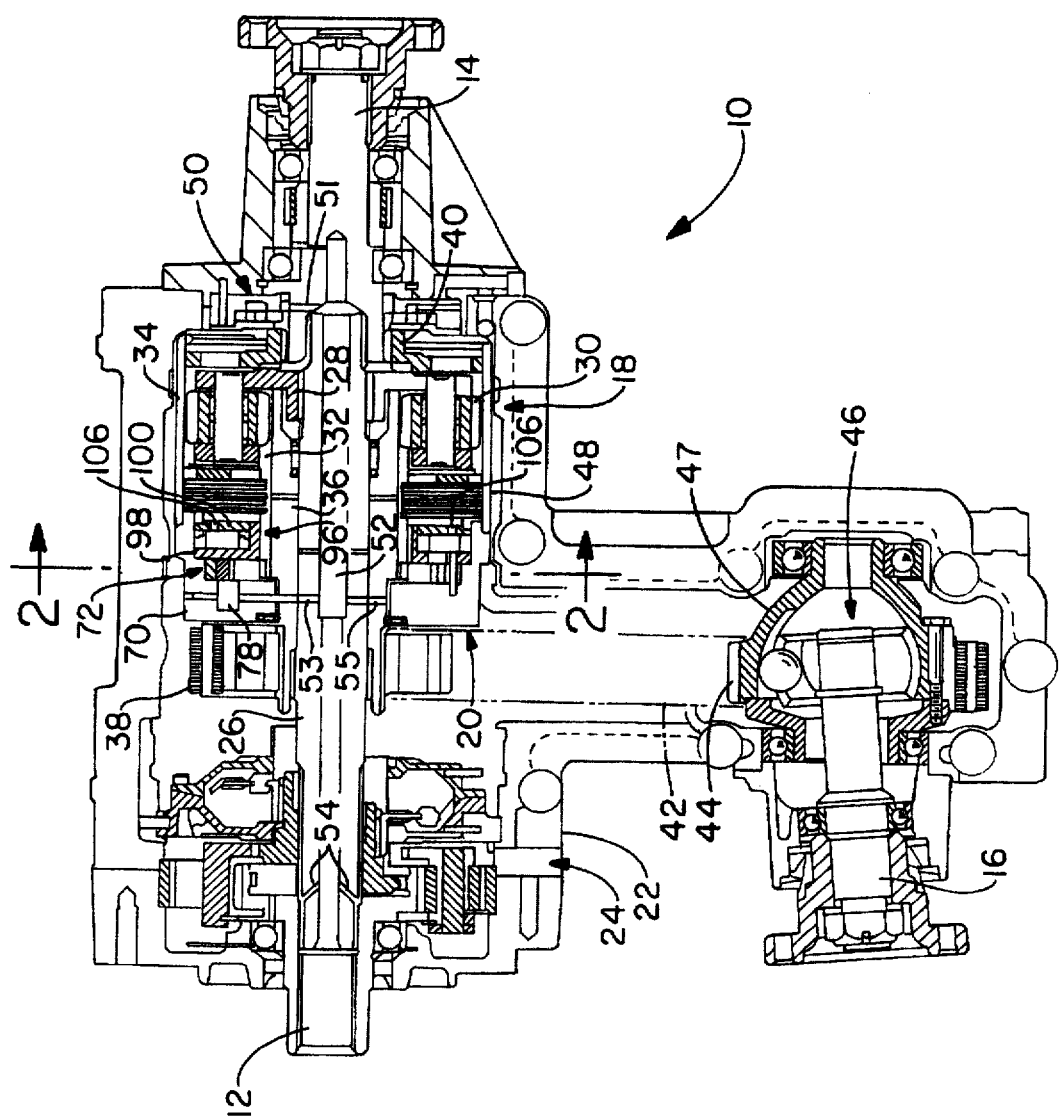
FIG. 1 is a cross-sectional view of a torque transfer case incorporating a first embodiment of the hydromechanical system of the present invention.

FIG. 1 shows a first preferred embodiment of the hydromechanical system of the present invention incorporated into a torque transfer case 10. The transfer case 10 is merely an example of a vehicle drivetrain subassembly in which the hydromechanical system of the present invention may be utilized. The torque transfer case 10 may be used in a four-wheel drive vehicle, for example, and includes an input shaft 12 which receives torque from an engine and transmission assembly (not shown) of a vehicle. A rear output shaft 14 and a front output shaft 16 are connected to the rear and front drive shafts (not shown) of the vehicle to provide drive power thereto. An inter-axle planetary gear differential generally indicated at 18 may be used to divide torque from input shaft 12 between the rear output shaft 14 and front output shaft 16. Associated with the inter-axle differential 18, the hydromechanical system for limiting differential speed between rotating members in the transfer case 10 is generally shown at 20. In this example, the hydromechanical system 20 does not inhibit differentiation between the output shafts 14, 16 during normal vehicle operation; such as may occur during cornering where differentiation between shafts 14, 16 is required. The hydromechanical system 20 limits the allowable differential speed between the shafts 14, 16.

Excessive differential rotation may occur between the output shafts 14, 16 when a front or rear wheel of the vehicle engages a surface having a low coefficient of friction, such as may occur when the wheel encounters mud or ice. The hydromechanical system 20 of the invention has the capacity to arrest relative rotation between the output shafts 14, 16 should relative rotational speed exceed a predetermined or prespecified limit, and also provides a mechanism by which torque may be transferred to a non-slipping axle upon the occurrence of excessive differentiation between the output shafts 14, 16. The hydromechanical system 20 provides these functions without requiring continuous relative rotation between the output shafts 14, 16, and without producing any undesirable torque transfer at relative rotational speeds below the prespecified limit. As is set forth in further detail below, the hydromechanical system 20 is designed such that the system 20 will contain a sufficient amount of hydraulic fluid to arrest relative rotation between the output shafts 14, 16 should differential rotation between these shafts 14, 16 occur, even at low vehicle speeds as may be encountered when the vehicle is initially set in motion.

The torque transfer case 10 shown in FIG. 1 is merely an example of a known torque transfer case, and the hydromechanical system 20 of the invention may be used with a variety of other known torque transfer cases, or wherever it is desired to limit differential rotation between two rotating members. As is shown in FIG. 1, the input shaft 12 may be rotatably supported within a housing 22. Although not a part of the invention, the input shaft 12 may be coupled through a planetary gear set 24 to an intermediate shaft 26 rotatably supported within housing 22. The planetary gear set 24 may provide low and high speed ranges in operation of the transfer case 10. The intermediate shaft 26 is coupled to and drives the planet carrier 28 of an interaxle planetary gear differential 18. Planet carrier 28 carries a plurality of circumferentially spaced and individually rotatable planet gears 30, each of which gears 30 meshingly engages with the sun gear 32 and ring gear 34 of the planetary gear differential 18. Sun gear 32 is rotatably mounted about intermediate shaft 26 and includes a sleeve portion 36 extending therefrom as a one-piece construction. In an alternative embodiment, sun gear 32 and sleeve portion 36 may be separate components that are coupled to rotate together through a splined connection or the like. Sleeve 36 may in turn carry a drive sprocket 38 coupled to rotate therewith. Ring gear 34 of the planetary gear differential 18 is drivingly connected to a link gear 40, which in turn is drivingly coupled to the rear output shaft 14 to provide driving torque thereto. In this arrangement of the example of torque transfer case 10, the torque is transmitted from the vehicle engine and transmission (not shown) to the input shaft 12 and through the planetary gear set 24 to the intermediate shaft 26. The intermediate shaft 26 in turn drives the planet carrier 28 associated with the interaxle planetary gear differential 18, transmitting torque to the sun gear 32 and ring gear 34 thereof. Driving torque is transmitted from the ring gear 34 to the rear output shaft 14, and through the sun gear 32 to drive sleeve 36 and the drive sprocket 38 associated therewith. The drive sprocket 38 is connected to a drive chain 42, or the like, to drive a second sprocket 44 coupled to rotate with the front output shaft 16. In the example of the transfer case 10 shown, torque is transmitted from drive chain 42 to front output shaft 16 through a constant velocity (CV) universal joint generally indicated at 46. Those skilled in the art will recognize, however, that the particular components of transfer case 10 to distribute torque from the input shaft 12 to output shafts 14 and 16 are merely an example, and a variety of arrangements may be utilized. The invention is therefore not meant to be limited to the particular torque transfer case arrangement shown, nor limited to use in a torque transfer case.

The hydromechanical system 20 according to the invention, may be used in the transfer case 10 to selectively lock the interaxle differential 18, and prevent differential rotation of output shafts 14 and 16 upon reaching a predetermined limit of differential rotation between these members. The system 20 may include a differential speed limiting clutch 48, which is provided to selectively lock ring gear 34 and sleeve 36 into rotation with one another, thereby arresting relative rotation between these members, and correspondingly between the rear output shaft 14 and front output shaft 16. Clutch 48 preferably comprises a plurality of interleaved friction plates 58, 60 (FIG. 3) with plates 58 splined to rotate with ring gear 34, and plates 60 splined to rotate with sleeve 36. A reaction member 110 is provided and is connected to ring gear 34 by a splined connection to rotate therewith. Reaction member is restrained from axial movement by a snap ring to thus provide a reaction force against the force the piston assembly 96, as will be described below, allowing clutch plates 58, 60 to be pressed forcibly together to actuate clutch 48. Therefore, upon actuation of clutch 48, ring gear 34 is coupled to rotate with sleeve 36, consequently coupling front and rear output shafts 16, 14. The hydromechanical system 20 is used to actuate the differential speed limiting clutch 48 if the relative rotation speed between these members exceeds a desired or prespecified limit. At low rates of differentiation, as may occur during turning operations and the like, the amount differentiation will not be of a sufficient magnitude to actuate clutch 48. However, in low traction conditions, differentiation will be of a sufficient magnitude to actuate clutch 48 to lock the interaxle differential as is discussed in further detail below.

Figure 3:
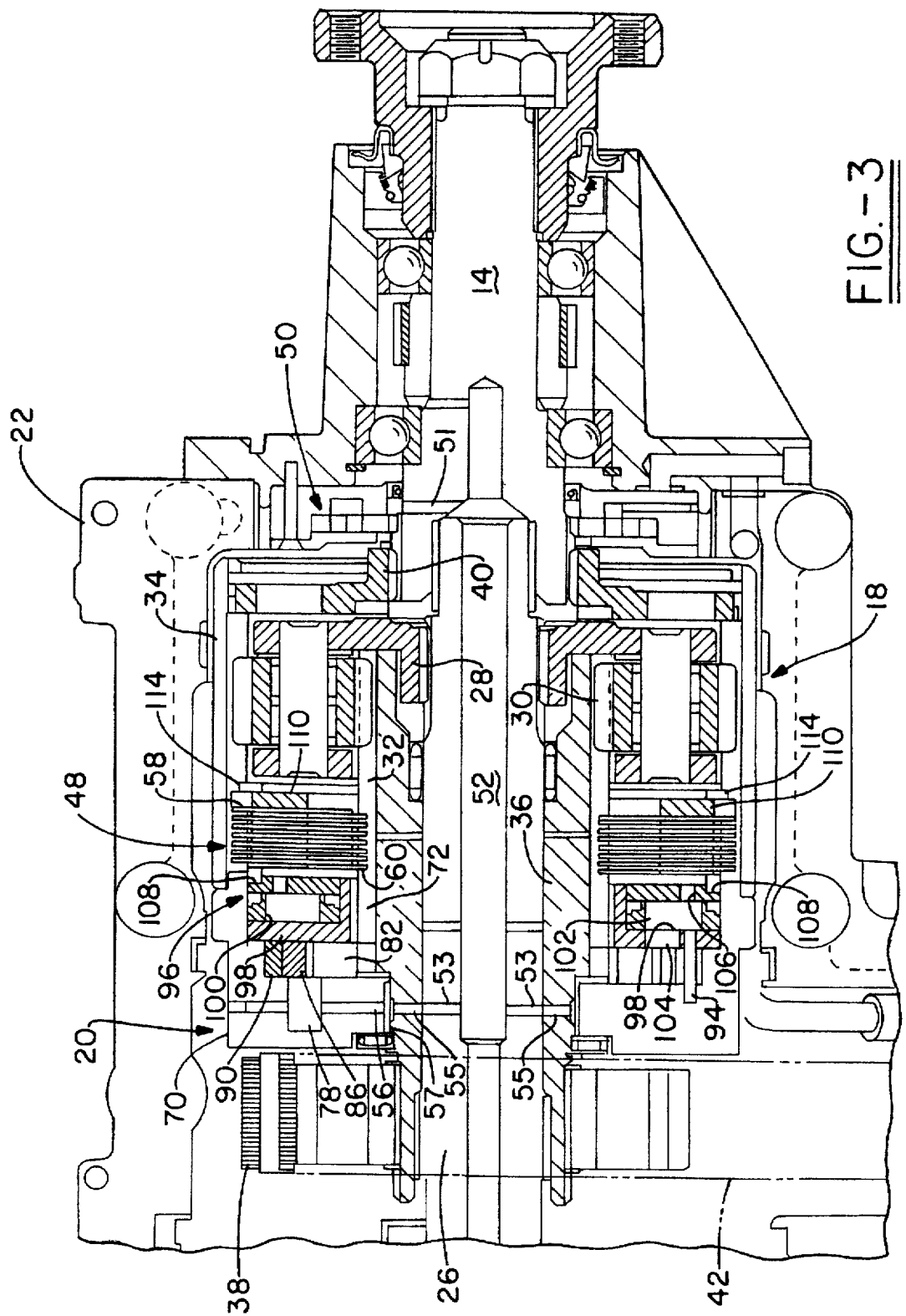
FIG. 3 is an enlarged, partial cross-sectional view of the hydromechanical system illustrated in FIG. 1.

Referring to FIG. 3, there is shown an enlarged view of the interaxle planetary gear differential 18 which divides torque between shafts 14, 16. As previously described, input torque may be supplied by shaft 26 and is distributed to rear output shaft 14 through ring gear 34 and to front output shaft 16 through sun gear 32 along with corresponding sleeve 36.

The sleeve 36 supplies torque to drive sprocket 38 and drive chain 42 connected to a front output shaft 16 (shown in FIG. 1). The hydromechanical system 20 is disposed within the transfer case housing 22, and includes a pump housing 70 coupled for rotation with ring gear 34 which in turn is coupled to the rear output shaft 14 through link gear 40. Housing 70 includes a fluid reservoir 78 formed therein and designed to contain a quantity of hydraulic fluid to actuate clutch 48. Forming reservoir 78 directly in housing 70, as opposed to in an adjacent, non-rotating member, eliminates the possibility that friction between the rotating housing 70 and a non-rotating reservoir will cause the components to become heated and welded together.

Figure 2A:
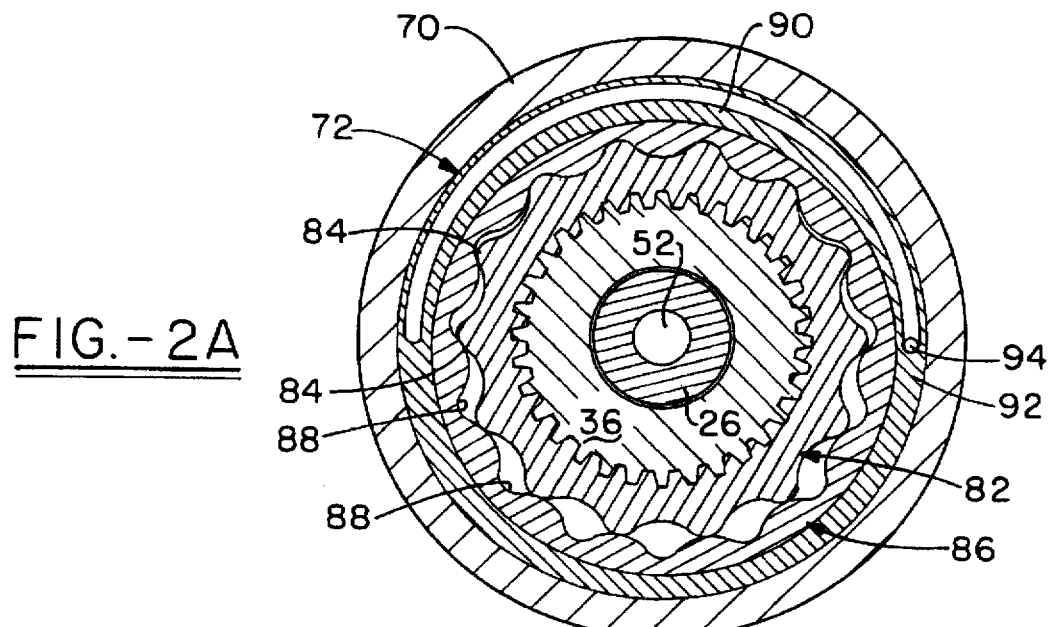
FIG. 2A is a view taken along line 2—2 of FIG. 1, illustrating the reversible hydraulic pump in a first position.
Figure 2B:
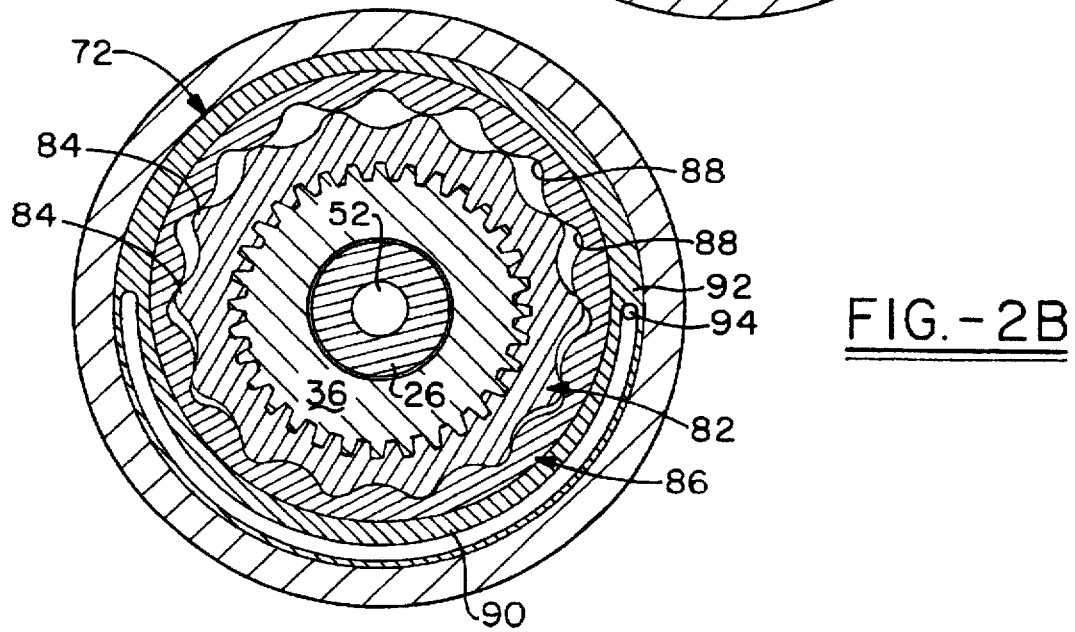
FIG. 2B is a view taken along line 2—2 in FIG. 1, illustrating the reversible hydraulic pump in a second position.

As may be seen more clearly by referring also to FIGS. 2A and 2B, housing 70 contains reversible hydraulic pump which is preferably a reversible gerotor pump 72 including an outer eccentric ring 90 and outer impeller or rotor 86 coupled to housing 70 for rotation therewith, and thus for rotation with output shaft 14. Reversible hydraulic pump 72 also comprises an inner impeller or rotor 82 coupled for rotation with sleeve 36, and thus with front output shaft 16. Inner rotor 82 includes a plurality of external teeth or lobes 84 and outer rotor 86 includes a plurality of internal teeth or lobes 88 which are in meshing engagement with some of external teeth 84 of inner impeller 82. Generally, inner rotor 82 will have one less tooth than outer rotor 86, such that driving of inner rotor 82 will in turn cause driving of outer rotor 86 which is free to rotate within outer eccentric ring 90. Relative rotation of the inner rotor 82 and outer rotor 86 thus provides a series of variable volume chambers within pump 72, resulting in the build-up of fluid pressure and pumping of hydraulic fluid in response to such relative rotation of the rotors 82, 86, and thus, in response to differentiation between shafts 14, 16. The eccentric ring 90 includes a flange 92 extending approximately 180 degrees around the periphery of ring 90, which cooperates with a stop pin 94 supported on housing 70. Pump 72 is reversible, such that hydraulic fluid is pumped in response to differentiation between rotors 82, 86, regardless of the direction in which the rotors are rotating. This allows the pump to lock the interaxle differential 18 regardless of which shaft 14, 16 is overrunning the other, and regardless of the direction of rotation of the shafts 14, 16. In FIG. 2A, the pump is shown rotating in the direction of the arrow, such that rotation of ring 92 is stopped by stop pin 94, and the external teeth 84 of inner rotor 82 meshingly engage internal teeth 88 of outer rotor 86 at a top portion of the eccentric bore provided in ring 90. If the differential rotation of the shafts 14, 16 is reversed, the outer ring 90 will rotate approximately 180 degrees, with the stop pin 94 contacting flange 92 to stop rotation of ring 90. As shown in FIG. 2B, the eccentric bore in ring 90 is thus moved such that the external teeth 84 of inner rotor 82 meshingly engage internal teeth 88 of outer rotor 86 at a bottom portion thereof, with pumping capacity maintained. Thus, pump 72 pumps hydraulic fluid in response to relative rotation between ring gear 34 and sleeve 36, which originates from differentiation in the rotational speeds of shafts 14, 16, regardless of the direction of the relative rotation between these shafts.

During normal driving conditions where there is no relative rotation between the front output shaft 16 and rear output shaft 14 of the torque transfer case 10, such as when the vehicle is traveling straight down a roadway, the hydraulic pump 72 does not operate to pump hydraulic fluid, and piston 96 (described below) does not actuate the differential speed limiting clutch 48 forming a part of the interaxle gear differential 18. Similarly, during normal turning of the vehicle, differentiation between front and rear output shafts 14, 16 is allowed up to that amount of differentiation that occurs at the maximum steering angle of the vehicle. The hydromechanical system 20 allows such differential rotation without actuating clutch 48. During turning, although differential rotation will cause hydraulic pump 72 to pump fluid in response thereto, the amount of pumping is not sufficient to actuate clutch 48. Accordingly, during normal driving conditions, virtually no axial force is applied to clutch 48, allowing planetary gear differential 18 to perform in a normal manner. On the other hand, when the hydraulic fluid pumped by hydraulic pump 72 reaches a predetermined pressure, corresponding to a given magnitude of differential rotation between front and rear output shafts 16, 14, respectively, pump 72 generates sufficient hydraulic pressure to compress clutch plates 58, 60 to arrest relative rotation of the shafts 14, 16.

To actuate clutch 48, the hydromechanical system 20 additionally comprises an annular piston shown generally at 96 which is disposed within housing 70 and includes a guide member 98 and an actuating member 100 which slidably engages guide member 98. Piston 96 further includes a chamber 102 which is disposed between guide member 98 and actuating member 100 and receives hydraulic fluid from reservoir 78 through supply passage 104 formed in guide member 98 in response to pumping action of pump 72. Guide member 98 also provides support for stop pin 94. A spring such as an annular spring 108 is provided between clutch assembly 48 and actuating member 100 to act upon actuating member 100. Spring 108 is preferably an over-centering spring, such as a "finger washer" or wave spring, and restrains piston actuating member 100 from engagement with clutch assembly 48 until sufficient hydraulic pressure is established within chamber 102 to overcome the force of spring 108 as is discussed more fully below, and as is also discussed in the copending and commonly assigned U.S. patent application Ser. No. 08/430,503, filed Apr. 28, 1995 in the name of Joseph A. Dick, which application is incorporated by reference herein. Spring 108 may be an over-centering type spring providing a non-linear spring constant which exhibits non-linear load versus deflection characteristics. Alternatively, spring 108 may be a coil spring or other spring having a linear spring constant exhibiting linear load versus deflection characteristics. The choice of the type of spring element 108 is dependent upon the desired spring characteristics for a particular application, and the clutch actuating characteristics in any particular hydromechanical system 20 may be varied and "tuned" as desired by altering the characteristics of spring 108 as is described fully in the above-mentioned copending, commonly assigned application.

Actuating member 100 of piston 96 includes at least one, and preferably a plurality of restricted vent passages 106 formed therethrough. Each vent passage 106 extends through piston actuating member 100 and is in fluid communication with piston chamber 102. Vent passages 106 are designed to provide a path through which the hydraulic fluid pressure generated by pump 72 may "bleed" to control the magnitude of hydraulic pressure required to actuate clutch 48, in addition to the control provided by varying the characteristics of spring 108. It can be seen that by varying the size of passages 106, a greater or lesser amount of hydraulic pressure generated by pump 72 will be required to move actuating member 100 axially against clutch assembly 48 to compress friction plates 58, 60 to thereby actuate clutch 48. For example, smaller vent passages 106 will allow less of the hydraulic pressure created by pump 72 to bleed from the chamber 102, wherein, actuating member 100 will be moved against clutch assembly 48 in response to a lesser amount of pumping by pump 72. Alternatively, larger vent passages 106 will allow hydraulic pressure to bleed more easily from chamber 102, requiring more pumping capacity from pump 72 before sufficient hydraulic pressure will accumulate within chamber 102 to move actuating member 100 axially against plate 60. In either case, once the actuating member 100 is moved axially against clutch assembly 48, vent passages 106 become at least somewhat blocked, resulting in the rapid accumulation of hydraulic pressure in chamber 102, providing the required force to axially compress friction plates 58, 60 to actuate clutch 48.

Figure 4:
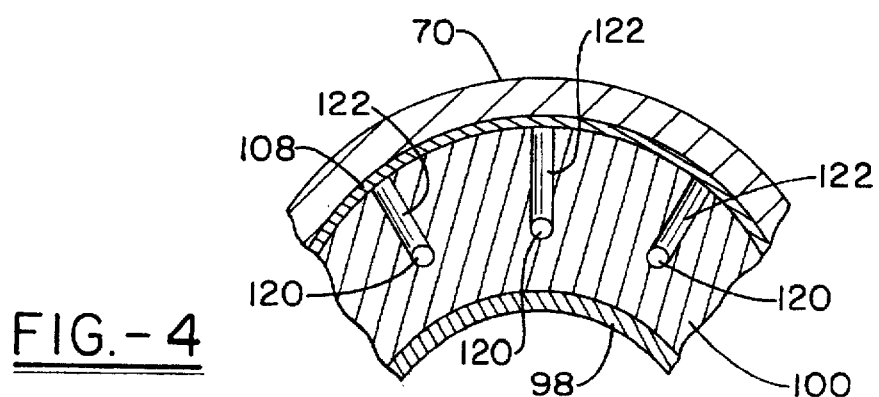
FIG. 4 shows an alternative embodiment of the hydromechanical system in accordance with the present invention.

Actuation of clutch 48 locks the planetary differential 18, and rotatably couples ring gear 34 and sun gear 32 to one another, arresting differentiation between output shafts 14, 16. After actuation of clutch 48, it is then desirable to deactuate clutch 48 and allow differentiation between output shafts 14, 16 when normal driving conditions are again attained. Thus, after a relatively short period of time, which may comprise a few seconds, clutch 48 may be unloaded by bleeding hydraulic pressure in chamber 102 through gaps in the piston assembly 96 resulting from machining intolerances and/or other predesigned vent passages. For example, as is shown in FIG. 4, piston actuating member 100 may include one or more bleed passages 120 which communicate with bleed channels 122 formed in the surface of actuating member 100 adjacent to clutch assembly 48. Bleed passages 120 and bleed channels 122 provide restricted passage of hydraulic fluid from piston chamber 102 to slowly bleed off hydraulic pressure established in the piston assembly 96 upon actuating clutch 48 in a desired manner. Once sufficient hydraulic pressure has bled from chamber 102, spring 108 is able to move piston assembly 96 axially away from clutch assembly 48, allowing friction plates 58, 60 to slip relative to one another.

The transfer case 10 or other drivetrain subassembly may also include a second pump such as a lubrication pump, indicated generally at 50, which may be a gerotor pump or any other suitable pump. Transfer case 10 is generally partially filled with a quantity of lubricating fluid such as oil, and pump 50 is designed to pump the oil found within the transfer case 10 through a network of channels and orifices to various regions of the transfer case to ensure that all bearings and other moving parts are bathed in the required amount of lubricating oil. Pump 50 may be driven by shaft 14 and is designed to pump at all times while the vehicle is in motion. Alternatively, pump 50 may be controlled electronically through wheel speed sensors or any other suitable electronic connection such that pump 50 pumps fluid under certain predetermined conditions, such as at certain vehicle speeds, during periods of wheel slip, or in response to any other predetermined condition. Pump 50 is in fluid communication with a variety of orifices and lubrication channels formed in housing 22 and other transfer case 10 components. For example, intermediate shaft 26 includes a lubrication channel 52 formed axially therethrough and in communication with other channels, for example channels 54 (FIG. 1), designed to direct lubricating fluid to components remote from pump 50. Pump 50 supplies fluid under pressure to channel 52 through one or more channels 51. It can be seen that lubrication channel 52 is also in fluid communication with channels 53 formed in intermediate shaft 26, and channels 55 formed through sleeve 36, to direct fluid radially outward to the pump housing 70. Pump housing 70 includes channels 56 formed therein designed to be in fluid communication with channels 53, 55 to receive fluid therefrom and communicate the same to pump reservoir 78. As mentioned previously, pump housing 70, sleeve 36, and shaft 26 may all rotate relative to each other. A bushing 57 is provided between housing 70 and sleeve 36 to support housing 70 relative to sleeve 36. Bushing 57 includes apertures or orifices formed therethrough that allow fluid from channel 55 to flow into channel 56. It can therefore be seen that when the vehicle, of which transfer case 10 is a part, is put into motion, reservoir 78 is supplied with hydraulic fluid under pressure from pump 50 through channels 51, 52, 53, 55, 56 to ensure that, should differentiation between the output shafts 14 and 16 occur, pump 72 will immediately be able to begin pumping hydraulic fluid from reservoir 78 into piston chamber 102. This eliminates the need for pump 72 to pull fluid, and consequently air, from feed lines or channels before it has a sufficient supply of fluid to actuate clutch assembly 48. Anytime fluid is pumped from reservoir 78 by pump 72, it will be automatically replenished by the action of the lube pump 50 as described above. Once reservoir 78 is filled, lube pump 50 continues to pump fluid to the other transfer case components as is described above.

In this way, the hydromechanical system 20 of the invention selectively couples first and second rotating members in the transfer case 10 to one another to eliminate differentiation therebetween, while avoiding any limitation to differentiation required during normal vehicle driving conditions. The hydromechanical system 20 has the capacity to arrest relative rotation should the relative rotational speed between the two rotating members of the vehicle drivetrain exceed a predetermined limit, thereby providing an autonomous mechanical mechanism for limiting relative rotational speed between two drivetrain components. The hydromechanical system 20 is self-contained and exerts negligible force below the predetermined differential rotational speed and then quickly provides a force sufficient to arrest differential rotation between the members once this predetermined threshold is met. Reservoir 78 of clutch pump 72 is maintained in a full condition by hydraulic fluid supplied by lube pump 50, to ensure that the clutch assembly 48 will be quickly actuated should excessive differentiation occur, and also to ensure that no air will enter the hydromechanical system 20. Also, because reservoir 78 is formed directly in the pump housing 70, the present invention avoids the possibility that components of the hydromechanical system will be damaged by the rotating pump housing, such as the components becoming welded together.

While the foregoing description has set forth the preferred embodiments of the invention in particular detail, it must be understood that numerous modifications, substitutions and changes can be undertaken without departing from the true spirit and scope of the present invention as defined by the ensuing claims. For instance, the hydromechanical system of the present invention may also be advantageously utilized in conjunction with other vehicle drivetrain sub-assemblies. The invention is therefore not limited to specific preferred embodiments as described but is only limited by the following claims.

What is claimed is:

1. A hydromechanical system for limiting differentiation between a first rotating member and a second rotating member in a drivetrain subassembly, said hydromechanical system comprising:

a clutch assembly for selectively coupling said first rotating member to rotate with said second rotating member;

a hydraulically actuated piston assembly for applying force on said clutch assembly to actuate said clutch assembly in response to hydraulic pressure such that said first rotatable member is selectively coupled to rotate with said second rotatable member;

a clutch actuating pump, including a reservoir, for supplying hydraulic pressure to said piston assembly to actuate said piston assembly, wherein said clutch actuating pump communicates hydraulic fluid under pressure to said piston assembly in response to differential rotation between said first and second rotating members; and a second pump in fluid communication with said reservoir of said clutch actuating pump for supplying hydraulic fluid to said reservoir of said clutch actuating pump.

2. A hydromechanical system as retired in claim 1, wherein said dutch actuating pump comprises a pump housing designed to rotate with one of said first and second rotatable members wherein said reservoir is formed in said pump housing such that said reservoir rotates with said pump housing.

3. A hydromechanical system as recited in claim 1, wherein said first rotatable member is coupled to rotate with a sun gear of a planetary differential, and said second rotatable member is coupled to rotate with a ring gear of a planetary differential, such that said dutch assembly selectively couples said sun gear to rotate with said ring gear.

4. A hydromechanical system as recited in claim 1, wherein said clutch assembly comprises at least one first friction plate coupled to rotate with said first rotatable member, and at least one second friction plate coupled to rotate with said second rotatable member, said first and second friction plates disposed adjacent one another with at least one of said first and second plates being axially movable such that said first and second plates are frictionally engaged together by said piston assembly upon the occurrence of a predetermined magnitude of hydraulic pressure upon said piston assembly to rotatably couple said first and second rotating members.

5. A hydromechanical system as recited in claim 1, wherein said clutch actuating pump is a gerotor pump comprising an inner rotor having a plurality of external teeth coupled to rotate with said first rotating member, an outer rotor driven by said second rotating member having a plurality of internal teeth wherein the number of internal teeth of said outer rotor is at least one greater than the number of external teeth of said inner rotor, said external teeth and said internal teeth in meshing engagement with one another, and an eccentric ring surrounding said outer rotor and in frictional engagement with said outer rotor for rotation therewith such that said eccentric ring and said outer rotor rotate together with said inner rotor and said first rotating member until said first and second rotating members rotate at different speeds to thereby cause said eccentric ring and said outer rotor to rotate eccentrically with respect to said inner rotor to pump hydraulic fluid to said piston assembly.

6. A hydromechanical system as recited in claim 1, wherein said piston assembly comprises a guide member and an actuating member slidably engaged with said guide member such that a chamber is formed between said guide member and said actuating member, said chamber in fluid communication with said clutch actuating pump such that said clutch actuating pump creates hydraulic pressure within said chamber upon pumping, said hydraulic pressure forcing said actuating member into engagement with said clutch assembly to actuate said clutch assembly.

7. A hydromechanical system as recited in claim 6, wherein said actuating member includes at least one restricted vent passage formed therethrough to regulate hydraulic pressure established within said chamber.

8. A hydromechanical system as recited in claim 6, wherein said piston assembly further comprises at least one spring positioned between said actuating member and said clutch assembly to disengage said actuating member from said clutch assembly when hydraulic pressure in said chamber is below a predetermined magnitude.

9. A hydromechanical system as recited in claim 1, wherein,
said second pump is a lubrication pump used to lubricate portions of said drivetrain subassembly.

10. A hydromechanical system as recited in claim 1, wherein,
said second pump is electronically controlled to pump fluid in response to predetermined conditions.

11. A hydromechanical system in combination with a drivetrain subassembly having an input shaft, and first and second output shafts, comprising:

an interaxle planetary gear assembly including a planet carrier coupled to rotate with said input shaft, a sun gear coupled to rotate with one of said first and second output shafts, a ring gear coupled to rotate with the other of said first and second output shafts, and a plurality of individually rotatable and circumferentially spaced planet gear positioned on said planet carrier in meshing engagement with said sun gear and said ring gear;

a clutch assembly for selectively coupling said ring gear to rotate with said sun gear;

a hydraulically actuated piston assembly for applying force on said clutch assembly to actuate said clutch assembly in response to hydraulic pressure such that said ring gear is selectively coupled to rotate with said sun gear;

a clutch actuating pump, including a reservoir, for supplying hydraulic pressure to said piston assembly to actuate said piston assembly, wherein said clutch actuating pump communicates hydraulic fluid under pressure to said piston assembly in response to differential rotation between said ring gear and said sun gear; and a second pump in fluid communication with said reservoir of said clutch actuating pump for supplying hydraulic fluid to said reservoir of said clutch actuating pump.

12. A hydromechanical system as recited in claim 11, wherein said clutch actuating pump comprises a pump housing designed to rotate with said ring gear wherein said reservoir is formed in said pump housing such that said reservoir rotates with said pump housing.

13. A hydromechanical system as recited in claim 11, wherein said dutch actuating pump is a gerotor pump comprising an inner rotor having a plurality of external teeth coupled to rotate with said sun gear, an outer rotor driven by said ring gear having a plurality of internal teeth wherein the number of internal teeth of said outer rotor is at least one greater than the number of external teeth of said inner rotor, said external teeth and said internal teeth in meshing engagement with one another, and an eccentric ring surrounding said outer rotor and in frictional engagement with said outer rotor for rotation therewith such that both said eccentric ring and said outer rotor rotate with said inner rotor until said ring gear and said sun gear rotate at different speeds to thereby cause said eccentric ring and said outer rotor to rotate eccentrically with respect to said inner rotor to pump hydraulic fluid to said piston assembly.

14. A hydromechanical system as recited in claim 11, wherein said piston assembly comprises a guide member and an actuating member slidably engaged with said guide member such that a chamber is formed between said guide member and said actuating member, said chamber in fluid communication with said clutch actuating pump such that said clutch actuating pump creates hydraulic pressure within said chamber upon pumping, said hydraulic pressure forcing said actuating member into engagement with said clutch assembly to actuate said clutch assembly.

15. A hydromechanical system as recited in claim 14, wherein said piston assembly further comprises at least one spring positioned between said actuating member and said clutch assembly to disengage said actuating member from said clutch assembly when hydraulic pressure in said chamber is below a predetermined magnitude.

16. A hydromechanical system as recited in claim 11, wherein at least one lubrication channel is provided in fluid communication with both said second pump and said clutch actuating pump reservoir, such that said reservoir receives fluid under pressure from said second pump.

17. A hydromechanical system as recited in claim 11, wherein said second pump is a lubrication pump designed to pump hydraulic fluid at least substantially continuously in response to rotation of at least one of said first and second output shafts such that said second pump communicates fluid to said clutch actuating pump reservoir upon rotation of said first or second output shafts.

18. A hydromechanical system as recited in claim 11, wherein said drivetrain subassembly is a torque transfer case.

19. A method of limiting differentiation between first and second rotating members comprising the steps of:

providing a clutch assembly for selectively coupling said first member to rotate with said second member;

providing a hydraulically actuated piston assembly for applying force on said clutch assembly to actuate said clutch assembly in response to hydraulic pressure such that said first rotatable member is selectively coupled to rotate with said second rotatable member;

providing a clutch actuating pump, including a reservoir, for supplying hydraulic pressure to said piston assembly to actuate said piston assembly, wherein said clutch actuating pump communicates hydraulic fluid under pressure from said reservoir to said piston assembly in response to differential rotation between said first and second rotating members;

supplying a fluid to said reservoir under pressure at least when said clutch actuating pump is not operative to communicate hydraulic fluid from said reservoir to said piston assembly.

20. The method as recited in claim 19, wherein said step of supplying fluid to said reservoir under pressure when said clutch actuating pump is not operative is accomplished by providing a second pump in fluid communication with said reservoir.

* * * * *